May 28, 1968 R. W. MICHAEL 3,385,100

PIEZOELECTRIC DETECTOR SYSTEM FOR FLUID COMPONENTS

Filed April 30, 1965 2 Sheets-Sheet 1

INVENTOR
R. W. MICHAEL

BY Young and Quigg

ATTORNEYS

May 28, 1968 R. W. MICHAEL 3,385,100

PIEZOELECTRIC DETECTOR SYSTEM FOR FLUID COMPONENTS

Filed April 30, 1965 2 Sheets-Sheet 2

INVENTOR
R. W. MICHAEL

BY Young and Quigg

ATTORNEYS

United States Patent Office 3,385,100
Patented May 28, 1968

3,385,100
PIEZOELECTRIC DETECTOR SYSTEM FOR FLUID COMPONENTS

Richard W. Michael, Bartlesville, Okla., assignor to Phillips Petroleum Company, a corporation of Delaware Filed Apr. 30, 1965, Ser. No. 452,398
5 Claims. (Cl. 73—23.1)

ABSTRACT OF THE DISCLOSURE

A detection system which employs at least two piezoelectric detectors, one of which is oscillating at a frequency higher than a reference oscillator and the other of which is oscillating at a frequency lower than the reference oscillator, the output frequency of each detector and its associated oscillator being beat against the reference oscillator output frequency to produce two difference frequencies.

This invention relates to a method and apparatus for detecting at least one component in a substance. In one aspect this invention relates to a detection method and apparatus for detecting components in the effluent of a chromatographic analyzer.

Heretofore piezoelectric crystals coated with a gas chromatographic substrate which interacts with various components in the effluent of a chromatographic analyzer have been employed as gas chromatographic detectors. However, the electric circuitry associated with such detectors and with the recording apparatus utilized to preserve the manifestations of those detectors has required the use of a zero suppression circuit, i.e. a circuit which adjusts the output voltages of the system to zero when the carrier gas of the analyzer is passing through the system but is not carrying a component to be detected. Also, these systems have been subject to output signal aberration due to drift, i.e. variations in the output of a circuit under a substantially fixed state (where ideally no variations should occur) due to changes in external conditions such as temperature; and non-linearity, i.e. variation in voltage output due to changes in frequency of oscillation.

It has now been found that zero suppression circuits can be eliminated and output aberrations due to drift and non-linearity substantially obviated by employing at least two piezoelectric detectors, one of which is oscillating at a frequency higher than a reference oscillator and the other of which is oscillating at a frequency lower than said reference oscillator. The output frequency of each detector and its associated oscillator is beat against the reference oscillator output frequency to produce two difference frequencies.

A zero suppression circuit is not necessary in the above invention method because the differential frequencies and their representative voltages are bucking one another due to their respective relation to the reference oscillator frequency.

Output aberrations due to drift and non-linearity are obviated by the above invention method because, as with the zero suppression circuit, the two detector systems are bucking one another and whatever drift or non-linearity is effected on one system will also be effected on the other system substantially to the same degree and therefore these effects are canceled out. For example, if the voltage output of one detector system increases a finite amount with each kilocycle per second incremental increase, then the opposing detector system will also increase substantially the same finite amount per kilocycle per second increase and the differential between the outputs of the two systems will remain substantially the same. The same canceling out of effects is realized when, for example, the ambient temperature of both systems is increased or decreased.

A further major advantage of this invention is that an output signal from each detector system, which is the signal that is ordinarily recorded if a single detector system is employed as was done heretofore, is doubled in magnitude when the differential value of the output frequencies or voltages of the two detector systems of this invention is ascertained. By the method of this invention it is this differential output which is recorded and since this output has a magnitude substantially double that of the output of each separate detector system, the recordings of each component detected are much more pronounced. The doubling effect of this invention is due to one difference frequency in relation to ground increases while the other difference frequency in relation to ground decreases with each change in oscillation magnitude of the piezoelectric detectors.

The apparatus of this invention includes first and second piezoelectric materials each carrying a material or substrate which interacts with or absorbs at least one component in the substance or chromatographic analyzer effluent passing in contact with those piezoelectric materials. Separate oscillator means are operatively connected to each piezoelectric material, the output of which oscillator means is controlled by the frequency of vibration of the piezoelectric material. A single reference oscillator is provided and a mixer circuit for each piezoelectric material and associated oscillator is also provided. The output frequencies of each piezoelectric material and associated oscillator and the output frequency of the common reference oscillator are beat together in the mixer circuit associated with each detector to produce two difference frequencies. Means is then provided for ascertaining and recording a differential value from these difference frequencies.

Accordingly, it is an object of this invention to provide a new and improved method and apparatus for detecting at least one component in a substance. It is another object of this invention to provide a new and improved method and apparatus for detecting the components present in the effluent of a chromatographic analyzer.

Other aspects, objects and the several advantages of the invention will be readily apparent to those skilled in the art from the description, the drawing and the appended claims.

Figure 1:
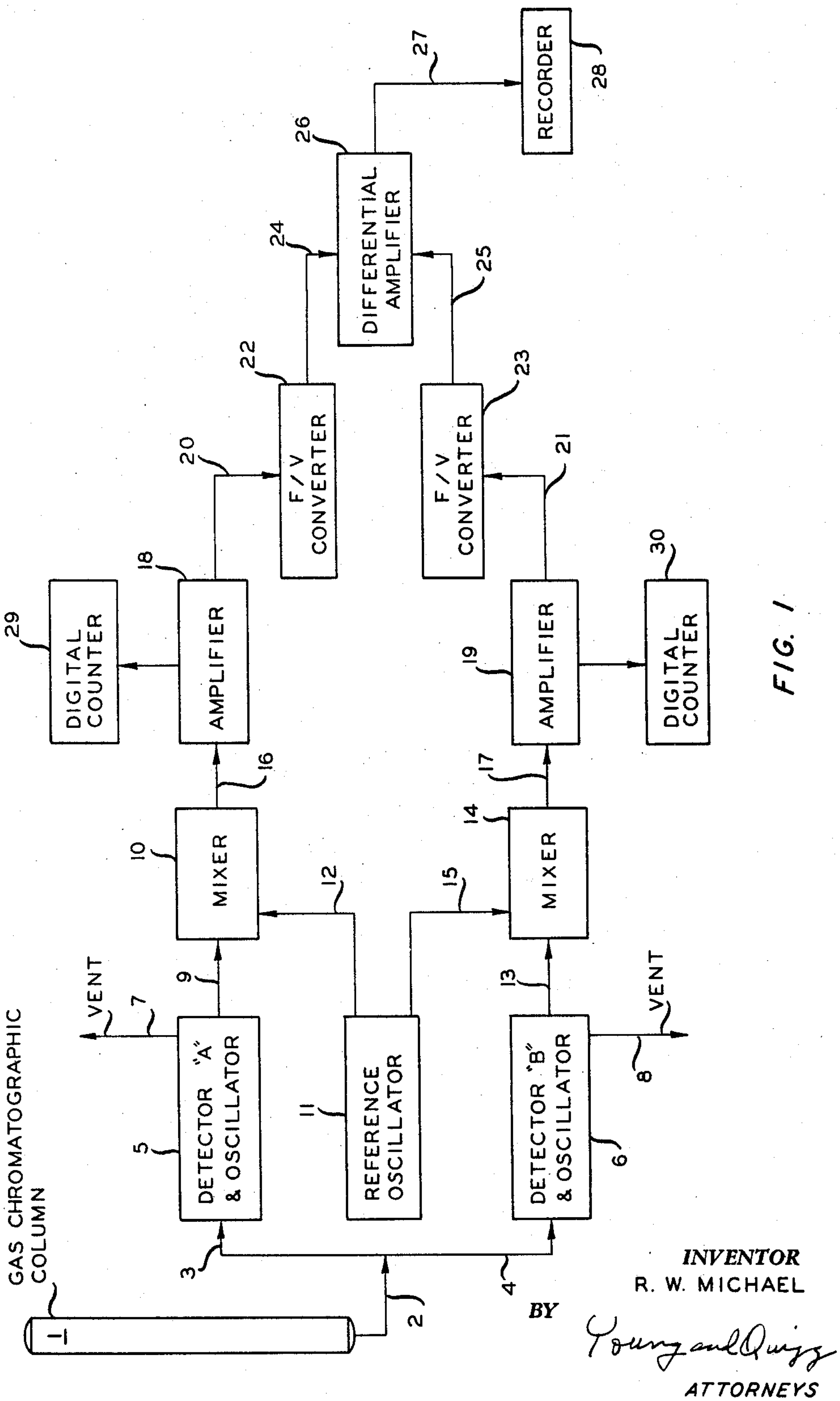
FIGURE 1 shows schematically a system embodying this invention.

In FIGURE 1, there is shown a gas chromatographic analyzer the effluent of which passes into line 2 and is then split into lines 3 and 4 for passage into contact with a piezoelectric crystal carrying a gas chromatographic substrate or material in detectors 5 and 6. The effluent passes from detectors 5 and 6 through vents 7 and 8.

The piezoelectric crystals and their associated oscillators in detectors 5 and 6 vibrate at different frequencies when the substrate carried by each piezoelectric material is not interacting with or absorbing a component other than the carrier gas from the effluent from 1. For example, the normal, nonabsorbing frequency, i.e. when there is no interacting of a component or no presence of a component in the carrier gas in contact with the piezoelectric material, of detector 5 which is passed by 9 to mixer circuit 10 can be above normal, fixed frequency of reference oscillator 11 which is passed by 12 to mixer 10. If the normal frequency for detector 5 is above that for reference oscillator 11, then the normal, nonabsorbing output frequency for detector 6 which is passed by 13 to mixer 14 is below the output frequency of reference oscillator 11 which is passed by 15 to mixer 14.

More specifically, as an example of operation without the use of actual or realistic values of crystal oscillation, if reference oscillator 11 has a substantially fixed output frequency of 1000 cycles per second then detector 5 can have a normal, nonabsorbing output frequency of 1100 cycles per second and detector 6 can have a normal, nonabsorbing output frequency of 900 cycles per second. When a component in the effluent from column 1 interacts with the substrate on the piezoelectric material in detectors 5 and 6 the output frequency of those detectors will be lowered due to a decrease in oscillation frequency of the piezoelectric materials in those detectors. For example, the output frequency of detector 5 can decrease by 20 cycles per second, i.e. from 1100 to 1080 cycles per second. At the same time the output frequency of detector 6 will also decrease 20 cycles per second, i.e. from 900 to 880 cycles per second. Thus, the 1080 cycles per second from detector 5 and the 1000 cycles per second from reference oscillator 11 will be beat together in mixer 10 to produce a single difference frequency output from mixer 10 of 80 cycles per second. Similarly, the output frequency from detector 6 of 880 cycles per second will be beat against the reference oscillator output frequency of 1000 cycles per second in mixer 14 to produce a single difference frequency output of that mixer of 120 cycles per second. When a differential value for the two difference frequencies, i.e. 40 cycles per second, is obtained it can be recorded to provide a tangible manifestation of the component in the effluent from column 1 that interacted with the substrate on the piezoelectric materials in detectors 5 and 6. It is important to note that the differential value of the two difference frequencies, i.e. 40 cycles per second, is double the magnitude of the decrease in the output frequency from each detector, i.e. 20 cycles per second. Heretofore, when a single detector was employed, it was, in effect, this decrease in output frequency of the detector, i.e. 20 cycles per second, that was recorded while, according to this invention, it is the differential value between the two output frequencies from the two mixers which is recorded which differential value is double the actual decrease in detector frequency output and therefore produces a more pronounced recording.

One of several conventional ways for obtaining a differential value representative of the frequency output 16 of mixer 10 and output 17 of mixer 14 is to pass those outputs through conventional amplifiers 18 and 19 and then pass the amplified output by 20 and 21 to conventional frequency-to-voltage converters 22 and 23 wherein the frequencies are converted to representative voltages in a known manner. The output voltages from 22 and 23 are passed by 24 and 25 to conventional differential amplifier 26 which produces a single output voltage 27 which voltage is obtained as a function of the corresponding changes in the input voltages 24 and 25 through the use of known linear equivalent circuits. The differential voltage 27 is then passed to recorder 28 which can be any conventional type of recorder such as one which manifests variances in the voltage in the form of peaks of varying height and slope on a graph.

If desired, digital counters 29 and 30 can be operatively connected to amplifier 18 and 19 for digital readout or for use in other digital equipment including computers.

The oscillator, mixer, amplifier, frequency-to-voltage converter, differential amplifier and recorder apparatus employed in this invention can vary broadly by the use of various conventional apparatus known in the art. The types of apparatus employed will vary according to specific needs and desires and will be obvious to those skilled in the art once the need and desires are known.

Figure 2:
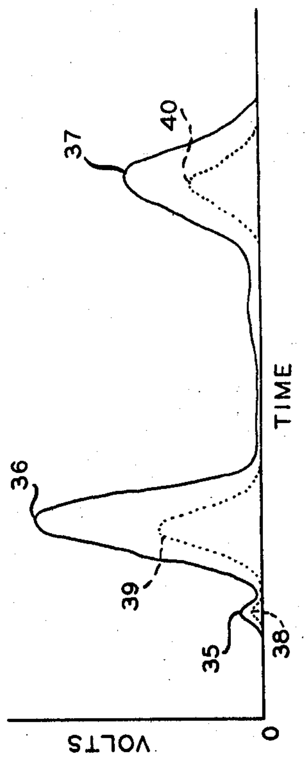
FIGURE 2 shows a graphic recording achieved by this invention and by the prior art.

FIGURE 2 shows a typical graphic manifestation, i.e a chromatogram, produced on a conventional recorder when employed in the method of this invention (solid line) and with a single detector (dotted line). The graph shows three components represented by peaks 35, 36, and 37 and peaks 38, 39, and 40. It can be seen that the peaks produced by this invention are significantly more pronounced and therefore easier to read both quantitatively and qualitatively. The more distinct peaks are a result of the doubling effect of this invention as described above.

Figure 3:
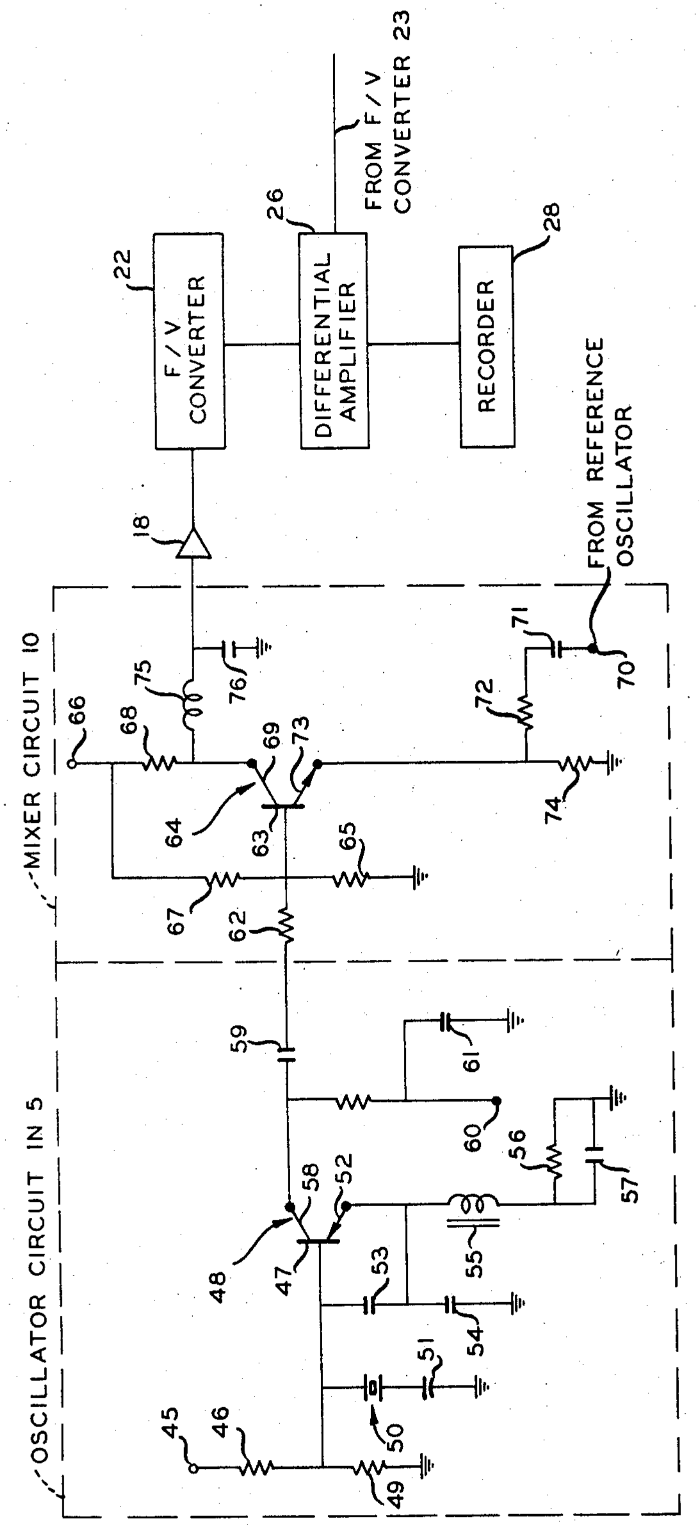
FIGURE 3 is a schematic circuit drawing of a crystal and oscillator circuit and a mixer circuit.

In FIGURE 3 one of many possible and known circuits is shown carrying out the steps of this invention. The oscillator circuit is provided with a potential connected to 45 which is connected through resistor 46 to base 47 of transistor 48 and through resistor 49 to the ground. Piezoelectric crystal 50 which carries the preferentially sorptive material is connected to base 47 of transistor 48 and through capacitor 51 to the ground. Emitter 52 of transistor 48 is connected through capacitor 53 to base 47 of transistor 48 and through capacitor 54 to the ground. Also, emitter 52 of transistor 48 is connected through coil 55 and through resistor 56 which is shunted by capacitor 57 to the ground. Collector 58 of transistor 48 which carries the output frequency of oscillation of crystal 50 passes that frequency through capacitor 59 to the mixer circuit. Collector 58 is also connected to a potential source at 60 and through a resistor and by-pass capacitor 61 to the ground.

The output frequency from the oscillator circuit passes through resistor 62 to base 63 of transistor 64. The input frequency signal is also connected through resistor 65 to the ground. A source of potential 66 is connected through resistor 67 to the base 63 of transistor 64 and also through resistor 68 to collector 69 of transistor 64. Input terminal 70 carries a frequency from reference oscillator 11 which has a circuit similar to the oscillator circuit shown. Oscillator 11, however, employs an uncoated crystal. The frequency from reference oscillator 11 passes through capacitor 71 and resistor 72 to emitter 73 of transistor 64. Emitter 73 is also connected to ground via resistor 74. Thus, the frequency from one oscillator circuit passing to base 63 of transistor 64 is beat against the frequency of a separate oscillator circuit passing to a different part of transistor 64, i.e. the emitter 73, and the difference frequency produced travels from collector 69 to transistor 64 through a low pass filter and coil 75 to amplifier 18 and from there to frequency-to-voltage converter 22 and from there to differential amplifier 26. The output voltage from frequency-to-voltage converter 23 is put into differential amplifier 26 along with that of frequency-to-voltage converter 22 and the differential voltage output from differential amplifier 26 is passed to recorder 28. The difference frequency signal lead is connected to ground through capacitor 76. Capacitor 76 is of a type that passes to ground higher frequencies than the difference frequency signal, e.g. the normal output frequency of the oscillator circuit when no signal is being beat thereagainst in the mixer circuit. Thus, in effect capacitor 76 bypasses to ground unwanted frequencies that are higher than the oscillator output frequency.

A similar oscillator and mixer circuit will be employed for detector 6 and mixer 14.

Generally, this invention is applicable to any gas analysis system such as a chromatographic column and the like and can employ any type of piezoelectric materials or crystals such as the well known quartz crystals. The sizes, shapes and frequencies of the crystals employed can vary widely but generally the size and shape will be such that the frequency is in the range of from about 500 kilocycles to about 200 megacycles, preferably from about 5 megacycles to about 20 megacycles.

The preferential absorption material or substrate can be carried on the crystal in any convenient manner but is preferably carried in the form of a liquid or at least semi-solid coating. Suitable conventional materials can be employed as the sorption material of this invention. For hydrocarbon detection materials such as squalane, silicone oil, apiezon grease, and the like, can be employed. For the detection of aromatic, oxygenated and unsaturated compounds, materials such as polyethylene glycol, sulfolane, dinonyl phthalate, alkyl sulfonate, and the like can be employed. For the detection of water vapor such materials as silica gel, alumina, natural resins, synthetic polymer, and the like can be employed. Other conventional materials which preferentially absorb the above and other materials are numerous and a comprehensive listing is, therefore, not attempted.

Generally, the detectors of this invention will be from about one-half to about two and one-half kilocycles above or below the frequency of the reference oscillator. Also, generally, when a component is being absorbed or otherwise interacted with the material carried by the piezoelectric crystals, the decrease of vibration of those crystals and therefore the output frequency of the detectors will be on the order of a few cycles to several hundred cycles per second. With such a small decrease in frequency output, the doubling effect, i.e. one frequency output of one detector in relation to ground increasing while the other frequency output of the other detector in relation to ground decreasing to produce a new difference between the two decreased output frequencies of the detectors of double that of the decrease for one detector, achieved by this invention is extremely important and in some cases can mean the difference between a readable and useless recording.

*Example*

A mixture of hydrocarbons containing approximately equal amounts of methane, butane and octane is injected into a chromatographic column having a carrier gas stream of helium passing therethrough at a rate of 10 to 100 cc./minute. In all, 0.5 cc. of the mixture is injected into the column which employs squalane as absorbent to separate the methane, butane and octane into discrete segments and spread each segment out over an increment of the helium stream. Half of the helium stream containing the segments of the above hydrocarbons is passed through each of detectors 5 and 6. Each detector has a piezoelectric quartz crystal therein coated with a thin layer of squalane. The piezoelectric quartz crystal in detector 5 has a normal, nonabsorbing frequency of 9.001 megacycles per second. The piezoelectric quartz crystal in detector 6 has a normal, nonabsorbing frequency of 8.999 megacycles per second. Reference oscillator 11 has a substantially fixed output frequency of 9.000 megacycles per second. The decrease in the normal, nonabsorbing output frequencies of detectors 5 and 6 is beat against the output frequency of reference oscillator 11 and two difference frequencies thereby formed which difference frequencies after amplification, conversion to the representative voltage, give a differential voltage which yields a chromatograph on a blank recorder similar to that shown in FIGURE 2 wherein peak 35 represents methane, peak 36 represents butane and peak 37 represents octane.

Reasonable variations and modifications are possible within the scope of this disclosure without departing from the spirit and scope of the invention.

I claim:

1. Apparatus for detecting at least one component in the effluent of a chromatographic column comprising first and second piezoelectric crystals each carrying a substrate which absorbs said at least one component, means for passing said effluent into contact with both said crystals, first and second oscillator circuits operatively connected, respectively, with said first and second crystals and adapted to have their output frequency changes in proportion to the change of oscillation of said crystals when absorbing said at least one component, first and second mixer circuits operatively connected to said first and second oscillators, a reference oscillator operatively connected to said first and second mixer circuits, each said first and second and reference oscillators having different normal frequencies, first and second frequency-to-voltage conversion means operatively connected to said first and second mixers, respectively, differential amplifier means operatively connected to said first and second frequency-to-voltage converters and adapted to produce a single differential voltage representative of the differential between the output voltages of said first and second converters, said differential representing said at least one component in said effluent.

2. Apparatus according to claim 1 wherein a digital counter is operatively connected to the output of each of said mixer circuits and a digital recorder is operatively connected to the output of each of said counters.

3. Apparatus according to claim 1 wherein a digital counter is operatively connected to the output of each of said mixer circuits and a digital to analog converter is operatively connected to the output of each of said counters.

4. The apparatus according to claim 1 wherein a recorder means is operatively connected to said differential amplifier to record said differential voltage.

5. Apparatus for detecting at least one component in a substance comprising at least one first and at least one second piezoelectric crystal each carrying a substrate which absorbs said at least one component, means for passing said substance into contact with said crystals, at least one first and at least one second oscillator circuits operatively connected, respectively, with said at least one first and said at least one second crystals and adapted to have their output frequency changes in proportion to the change of oscillation of said crystals when absorbing said at least one component, at least one first and at least one second mixer circuits operatively connected to said at least one first and said at least one second oscillators, a reference oscillator operatively connected to said at least one first and said at least one second mixer circuits, each of said at least one first and said at least one second and said reference oscillators having different normal frequencies, at least one first and at least one second frequency conversion means operatively connected to said at least one first and at least one second mixers, respectively, differential amplifier means operatively connected to said at least one first and said at least one second frequency converters and adapted to produce a single output representative of the differential between the outputs of said at least one first and said at least one second converters, said differential representing said at least one component in said substance.

References Cited

UNITED STATES PATENTS

| | | | |
|---|---|---|---|
| 3,260,104 | 7/1966 | King | 73—23 |
| 3,266,291 | 8/1966 | King | 73—23 |
| 3,277,430 | 10/1966 | Hagemann et al. | 73—178 X |

RICHARD C. QUEISSER, *Primary Examiner.*